(12) United States Patent
Crockett

(10) Patent No.: US 11,525,659 B2
(45) Date of Patent: Dec. 13, 2022

(54) TOOL FOR MEASURING THE SIZE, POSITION, SPACING AND OVERLAP LENGTH OF REBAR IN A CONCRETE STRUCTURE

(71) Applicant: Abigail L. Crockett, Houston, TX (US)

(72) Inventor: Abigail L. Crockett, Houston, TX (US)

(73) Assignee: Abigail Crockett, Houston, TX (US)

( * ) Notice: Subject to any disclaimer, the term of this patent is extended or adjusted under 35 U.S.C. 154(b) by 393 days.

(21) Appl. No.: 16/777,019

(22) Filed: Jan. 30, 2020

(65) Prior Publication Data

US 2020/0249005 A1 Aug. 6, 2020

Related U.S. Application Data

(60) Provisional application No. 62/799,873, filed on Feb. 1, 2019.

(51) Int. Cl.
*G01B 5/08* (2006.01)
*B25F 1/00* (2006.01)
*G01B 3/04* (2006.01)

(52) U.S. Cl.
CPC ............... *G01B 5/08* (2013.01); *B25F 1/00* (2013.01); *G01B 3/04* (2013.01)

(58) Field of Classification Search
None
See application file for complete search history.

(56) References Cited

U.S. PATENT DOCUMENTS

| | | | | |
|---|---|---|---|---|
| 2,409,019 A | * | 10/1946 | Cree | B23K 37/0443 33/562 |
| 5,459,936 A | * | 10/1995 | Stange | G01B 3/38 33/529 |
| 6,643,945 B1 | * | 11/2003 | Starks | E04G 21/185 33/562 |
| 6,907,674 B2 | * | 6/2005 | Grendahl | B43L 13/205 33/562 |
| 7,086,171 B2 | * | 8/2006 | Lawson | G01B 3/14 33/562 |
| 7,103,984 B2 | * | 9/2006 | Kastberg | E04G 21/185 33/562 |

(Continued)

FOREIGN PATENT DOCUMENTS

CN 109000528 A * 12/2018
DE 3414216 A * 10/1985 ............... G01C 9/26

*Primary Examiner* — Christopher W Fulton
(74) *Attorney, Agent, or Firm* — Leydig, Voit & Mayer, Ltd.

(57) ABSTRACT

A tool and system for measuring the size, position, and spacing of rebar in a concrete structure comprises a card preferably having a linear periphery. Around the periphery are a plurality of cutouts, with each of the cutouts adapted to measure the diameter of a standard rebar. The periphery of the card also has a series of hash marks to determine linear measurements. The amount of clear cover of the resulting concrete is measured by placing the tool on rebar inboard of the formwork and counting the hash marks to the adjacent formwork. The spacing between two rebars is measured by placing the tool on one rebar and counting the hash marks between two rebars. Alternatively, the distance between rebars and rebar overlap length is estimated by using the tool to determine the scale, if the space between bars is and overlap is longer that the tool length.

8 Claims, 7 Drawing Sheets

(56) References Cited

U.S. PATENT DOCUMENTS

| | | | | |
|---|---|---|---|---|
| 7,487,597 B2 * | 2/2009 | Diaz | ................. | E04B 1/4157 |
| | | | | 33/562 |
| 7,681,324 B2 * | 3/2010 | Hooks | ................. | E04B 7/022 |
| | | | | 33/562 |
| 8,011,111 B2 * | 9/2011 | Brady | ................. | G01B 3/004 |
| | | | | 33/562 |
| 8,387,329 B2 * | 3/2013 | Stevens | ................. | E04C 5/163 |
| | | | | 52/649.3 |
| 8,555,518 B2 * | 10/2013 | Tooman | ................. | E02D 27/42 |
| | | | | 33/645 |
| 9,435,130 B2 * | 9/2016 | Briganti | ................. | E04G 21/1891 |
| 11,286,667 B2 * | 3/2022 | Giles | ................. | E04C 5/0604 |
| 2002/0100180 A1 * | 8/2002 | Montefusco | ................. | B43L 13/205 |
| | | | | 33/563 |
| 2004/0003507 A1 * | 1/2004 | Jordan | ................. | H02G 3/00 |
| | | | | 33/566 |
| 2004/0172844 A1 * | 9/2004 | Murray | ................. | B26D 7/0006 |
| | | | | 33/563 |
| 2012/0324825 A1 * | 12/2012 | Vrame | ................. | E04H 12/2253 |
| | | | | 33/562 |
| 2020/0182598 A1 * | 6/2020 | Lowitz | ................. | G01B 5/08 |

* cited by examiner

TOOL FOR MEASURING THE SIZE, POSITION, SPACING AND OVERLAP LENGTH OF REBAR IN A CONCRETE STRUCTURE

CROSS-REFERENCE TO RELATED APPLICATION

This application claims priority to provisional application 62/799,873 filed on Feb. 1, 2019, the disclosure of which is incorporated herein in its entirety.

FIELD OF THE INVENTION

This invention relates to tools, systems and methods used in constructing and inspecting concrete structures.

BACKGROUND OF THE INVENTION

The durability and strength of a concrete structure are to a large degree determined by the proper size, location and spacing of steel reinforcing bars or rebar that are embedded in the structure. The concrete building trades have long needed a tool to provide quick visual measurements of these features by the contractor, as well as confirmation of these measurements by an inspector before the concrete is placed or poured and the rebar is buried. Often times a tape measure or ruler is used to provide these measurements. However, the straight edge of a tape measure or ruler makes it difficult to accurately determine the diameter of a cylindrical object like rebar. Also, a tape measure has hash marks that are often small and confusing when viewed from a distance, and the tape measure usually requires the use of two hands to stretch it and hold it. It is often desired that the measurer's other hand be used to operate a data entry device or camera to document the measurements while they are being made. Accordingly, the concrete construction and inspection trades need a single-handed tool to accurately measure rebar diameter, as well as clear cover, rebar spacing and rebar overlap length.

SUMMARY OF THE INVENTION

In one aspect, the invention provides a tool for measuring the size, position, and spacing of steel reinforcing bar or rebar in a concrete structure prior to the pouring of the concrete comprising a planar card preferably having a linear periphery. Around the periphery of the card are a plurality of cutouts, each of the cutouts is adapted to measure the diameter of a standard rebar diameter by having the rebar fit snugly in the cutout. Near the periphery of the card is also a series of hash marks of equal distance that can be used to obtain linear measurements. The amount of top, side and bottom clear cover of the resulting concrete with respect to the rebar can be easily measured by placing the straight edge of the tool on or adjacent the outer-most rebar and counting the hash marks to adjacent formwork. In many instances, the top clear cover is determined by the top of the side formwork after the concrete is placed and leveled. Similarly, the tool can be used to measure the spacing between two rebars by placing the straight edge of the tool at the center-line of a rebar and counting the hash marks between the center-lines of two adjacent rebars or by estimating the distance to the next rebar using the tool to determine the scale, if the space between rebars is longer that the tool length. Rebar overlap length can also be measured by placing the tool adjacent the end of one rebar and estimating the distance between the end of one rebar and the opposite end of an adjacent rebar by using the tool to determine scale and counting the tool lengths.

The invention also provides a method of confirming the proper size and location of rebar that are used as reinforcement in a resulting concrete structure. The method comprises the multiple steps of measuring the size of the rebar by using a tool comprising a planar card with generally linear periphery. The card has a plurality of cutouts along its periphery, with each cutout sized to accommodate one standard size of steel rebar. The card is placed perpendicular to the rebar with the rebar located in the cutout that is substantially equivalent to the diameter of the rebar, such that no space is observed between the cutout and the edge of the rebar. Said another way, the proper sized rebar is determined by the smallest cutout in which a bar can fit. A photograph can be taken of the rebar in the proper cutout to document that the proper size rebar has been used. The card also comprises hash marks of equal distance near the periphery. The top, side and bottom clear cover can also be measured by placing the edge of the card where there are no cutouts on or adjacent the outer-most rebar and counting the hash marks to adjacent formwork. The distance between rebar can also be measured by placing the edge of the card where there are no cutouts proximate the center-line of one rebar and either measuring the distance by counting hash marks, or estimating the distance to the center-line of the next adjacent rebar using the tool to determine the scale. Rebar overlap length can also be measured by placing the tool adjacent the end of one rebar and estimating the distance between the end of one rebar and the opposite end of an adjacent rebar by using the tool to determine scale and counting the tool lengths.

In one aspect, the invention also provides a system for confirming the proper size, location and spacing of rebar in a concrete structure initially defined by formwork prior to pouring of the concrete. The system comprises a planar rectangular card having a periphery with a plurality of cutouts. Each cutout is sized to be substantially equivalent to the diameter of a standard rebar diameter. The tool also has hash marks near the periphery, with the hash marks located at a standard distance from each other, for example a quarter of an inch. The system includes measuring the size of the rebar in the structure by placing the tool normal to the rebar with the rebar in the cutout of the same diameter as the rebar. The system also includes measuring the top, side and bottom clear cover by placing the tool on or adjacent a rebar inboard of the formwork and measuring the distance between the rebar and the formwork by counting the hash marks. The system also includes measuring the distance between rebars by placing the tool on top of and normal to a first rebar and measuring the distance to an adjacent rebar by counting the hash marks to the adjacent rebar if the distance is less than the length of the tool, or using the tool to visually determine the scale of the distance if the distance between rebars is greater than the length of the tool. Rebar overlap length can also be measured by placing the tool adjacent the end of one rebar and estimating the distance between the end of one rebar and the opposite end of an adjacent rebar by using the tool to determine scale and counting the tool lengths.

Further and alternative aspects and features of the disclosed principles will be appreciated from the following detailed description and the accompanying drawings. As will be appreciated, the principles disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION OF A PREFERRED EMBODIMENT

Figure 1:
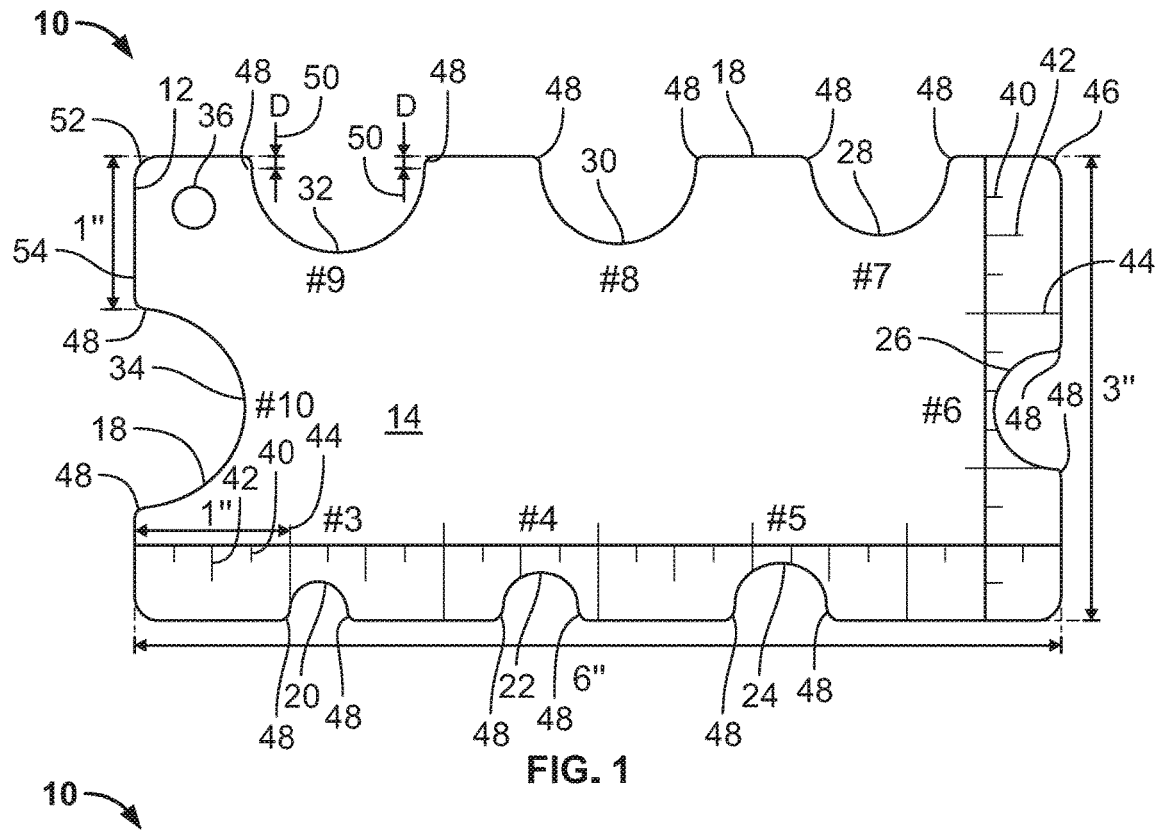
FIG. 1 is a top view of one embodiment of the inventive tool.
Figure 2:
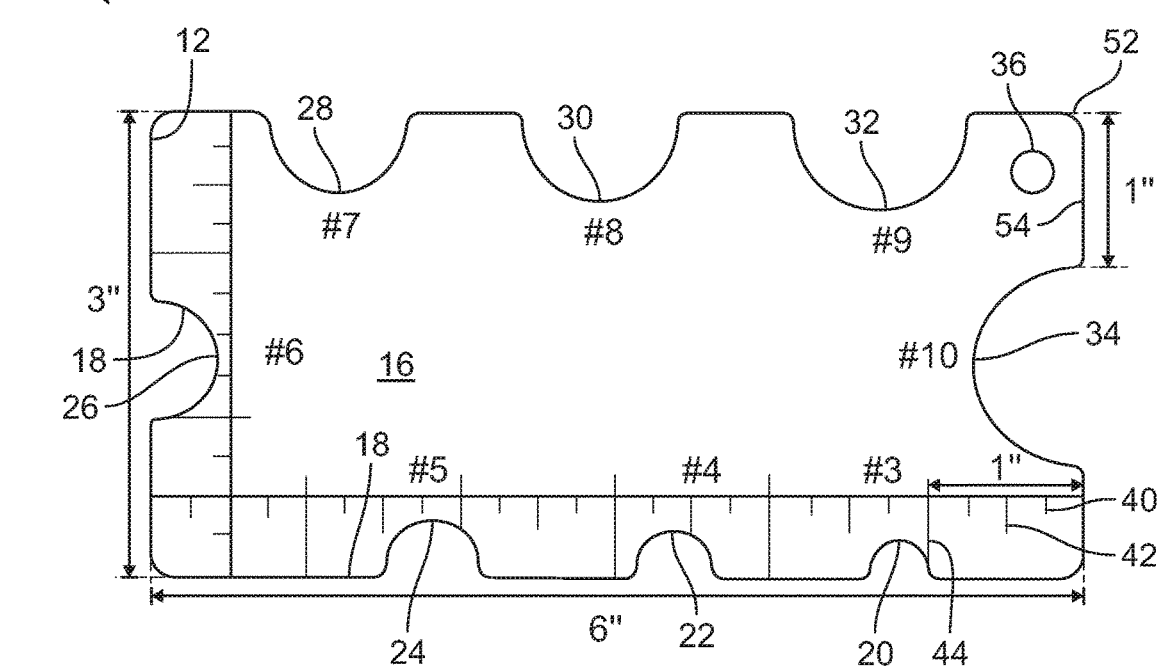
FIG. 2 is a bottom view of one embodiment of the inventive tool.

FIGS. 1 and 2 show the front 14 and back 16 sides or faces of a planar card 12 used in one embodiment of the rebar measuring tool 10. In other embodiments, only one side or face of the card may be labeled or engraved. Around the periphery or outer edge 18 of the card 12 in one embodiment are eight cutouts 20, 22, 24, 26, 28, 30, 32, 34 that are substantially equivalent to the diameters of #3 through #10 standard steel reinforcing bar or rebar respectively. In standard practice, each number diameter of rebar is equivalent to ⅛ inch in diameter up to one inch. Accordingly, a #3 rebar is ⅜ inch in diameter and a #8 rebar is one inch in diameter, #9 rebar is 1.128 inches and #10 rebar is 1.270 inches in diameter. The cutouts are sized appropriately to measure each size. The number of and sizes of the cutouts may vary in other embodiments of the tool 10. The strength and durability of a finished concrete structure is due to a large degree to the proper size and location of the rebar within the concrete, and a tool that provides easy, accurate measurement of these factors provides an advancement in the field.

In a preferred embodiment, the tool 10 is rectangular with a major dimension of between six and ten inches and a minor dimension of between three and five inches. Other shapes and sizes of cards 12 are also contemplated. In one embodiment, the corners 46 of the card 12 are rounded with a ⅛" radius to eliminate any sharp corners. In some embodiments, the outer edge along the periphery 18, possibly including the cutouts, is chamfered to eliminate a sharp edge along the periphery 18. The card can be made of any substantially planar material such as plastic, stainless steel or other metals, wood or coated cardboard.

In the embodiment shown in FIGS. 1 and 2, the cutouts 20-34 are semi-circular in shape with a radius equal to one half of the appropriate diameter. Also, a bevel 48 is located at the intersection 50 of the cutout with the periphery 18 to eliminate a sharp corner at this location on each cutout. In one embodiment, as seen in FIG. 1 and exemplified in cutout 32, this bevel 48 has a radius of 1/16" as shown by distance D. Again as exemplified by cutout 32, the radius of each of the cutouts 20-34 is recessed into the card 12 and away from the periphery 18 by the amount of the radius 48, or distance D. Since the bevel portion of the cutouts will not be used to measure the radius of the rebar, this ensures an accurate measurement of the diameter of the associated rebar. FIGS. 1 and 2 also show a tool 10 with an aperture 36 near one corner of the card 12 to accept a karabiner or similar connector or clip for easily attaching the tool to, for instance, a belt loop for easy transport of the tool.

Figure 3:
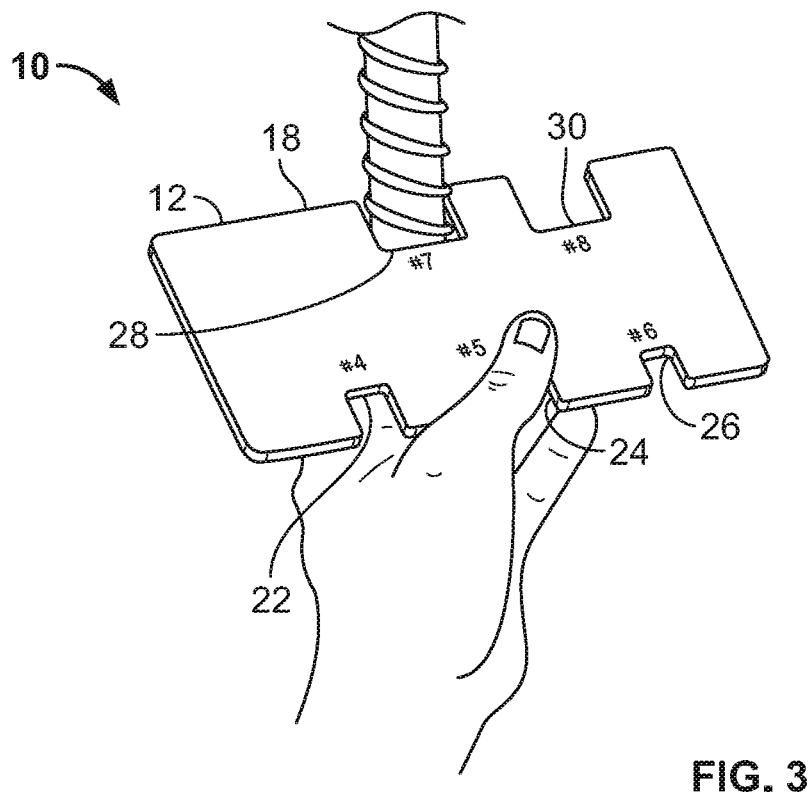
FIG. 3 is a perspective view of one embodiment of the tool being used to measure the diameter of a rebar.

FIG. 3 shows a method of measuring the diameter of a rebar incorporating one embodiment of the tool 10. In this embodiment, the cutouts 22-30 are rectangular shaped, with the dimension parallel to the edge or periphery 18 of the card substantially equivalent to the diameter of the standard rebar to be measured in that cutout. The depth of the cutout needs to be sufficient to allow the rebar to slide into the cutout at least one half diameter, so the parallel sides of the cutout can be proximate the rebar at its full diameter. The card 12 is placed normal to the rebar, and the card 12 is slid onto the rebar so that the rebar fills the cutout. The cutout that provides little or no clearance, in this case cutout 28 for a ⅞" diameter rebar (#7 rebar), is being measured. The tool is clearly able to be manipulated by a user's single hand as shown in FIG. 3. The user's other hand can then be used to contemporaneously make data entries, notes or photographs of the measurement being made by the tool.

Figure 4:
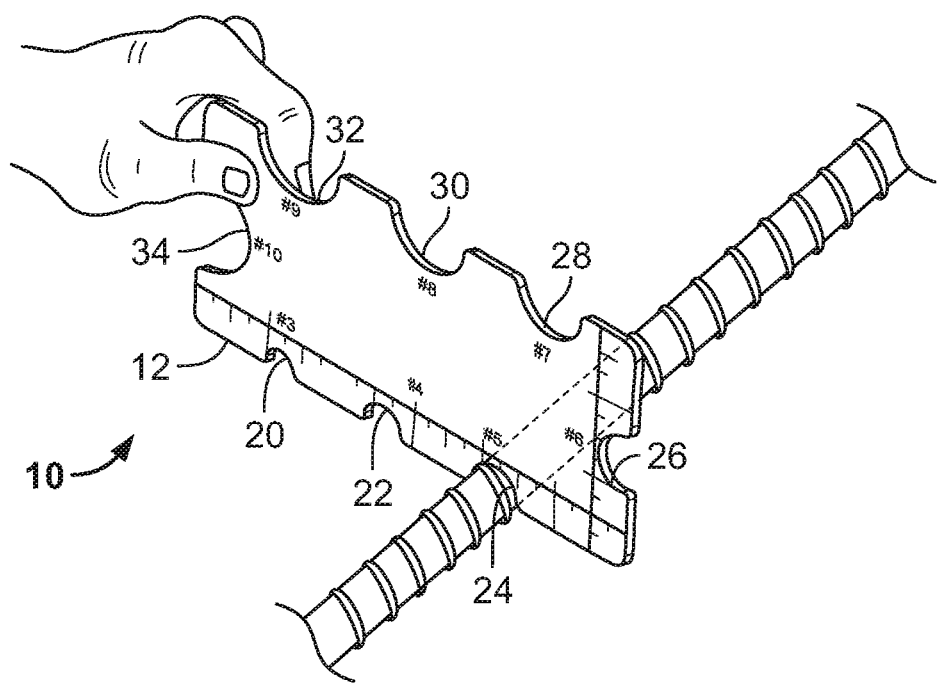
FIG. 4 is a perspective view of one embodiment of the tool being used to measure the diameter of a rebar.

FIG. 4 shows a similar method of measuring the diameter of a rebar using another embodiment of the tool 10, as shown in FIGS. 1 and 2. Again, the card 12 is placed normal to the rebar and the cutout that provides little or no clearance with the rebar, in this case cutout 24 for ⅝" diameter rebar (#5 rebar) provides quick easy measurement of the diameter of the rebar. Again FIG. 4 shows the tool is clearly able to be manipulated by a user's single hand. The user's other hand can then be used to contemporaneously make data entries, notes or photographs of the measurement being made by the tool.

Also near the periphery 18 of at least two sides of the card 12 are minor hash marks 40, major hash marks 42 and inch marks 44. In a preferred embodiment, the minor hash marks 40 designate quarter inch increments of distance, the major hash marks 42 designate half-inch increments of distance, and the inch hash marks 44 designating one inch of distance. One embodiment of the tool 10 also provides a convenient edge 54 on the minor dimension by the aperture 36 to measure one inch along the periphery 18 between the corner 52 and the cutout 34, as seen in FIGS. 1 and 2.

Figure 7:
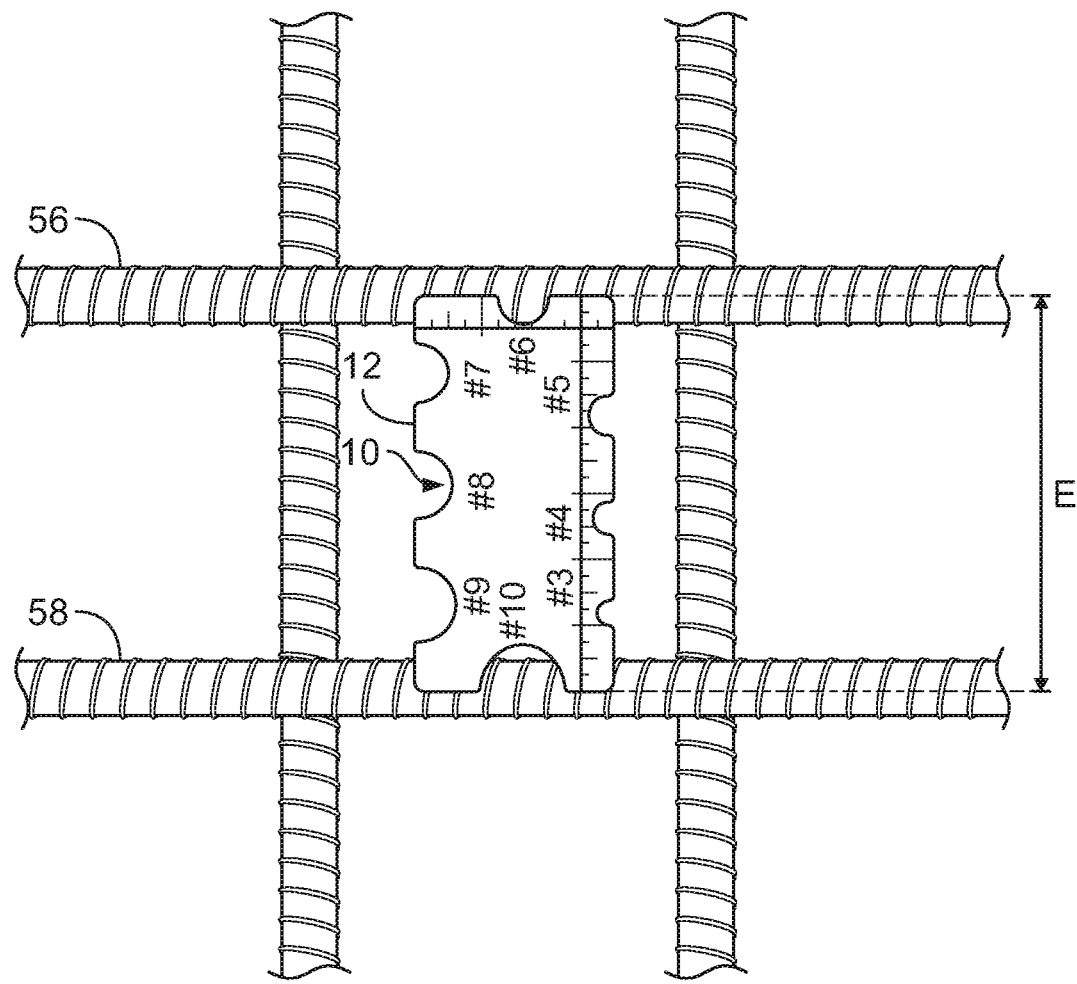
FIG. 7 is a top view of a tool being used to measure the spacing between two adjacent rebars.
Figure 8:
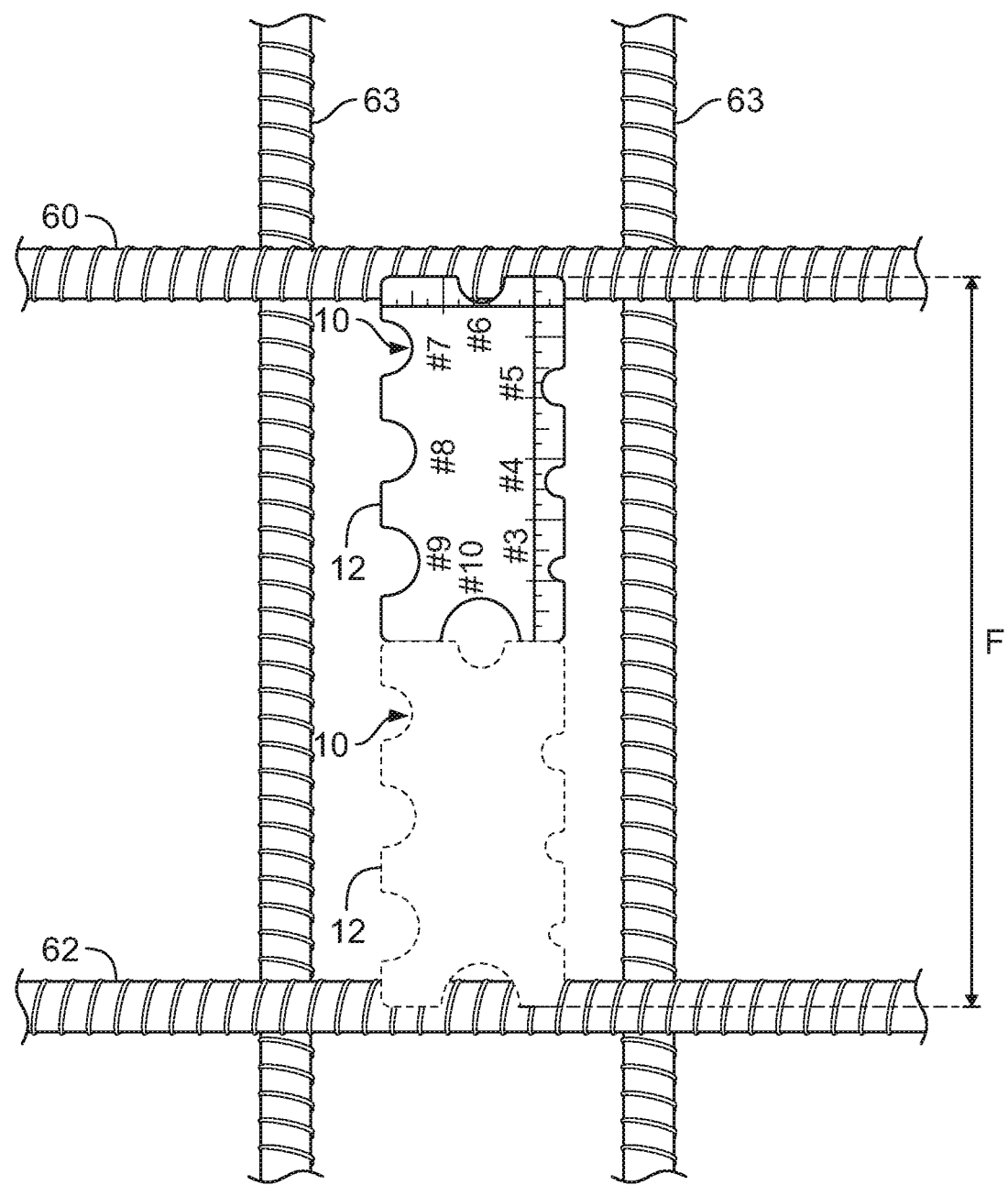
FIG. 8 is a top view of a tool being used to measure the spacing between two adjacent rebars that are spaced at a distance further than the length of the tool.

One standard distance between adjacent rebar in a water containing structure is 6 inches. Accordingly, as shown in FIG. 7, with the card 12 of the tool 10 being six inches long in the major dimension, one can readily determine and verify the distance E between the center-lines of parallel rebars 56 and 58, especially when they are six inches apart. Other structures may have rebar spaced at 12 inches, as shown in FIG. 8, or 18 inches apart. Again, the six-inch long tool can be used as a visual indicator to provide a quick, fairly accurate estimate of the distance F in FIG. 8 between a first 60 and second 62 rebar in at least two ways. First, the tool can be positioned so that the major six-inch dimension extends normal to the first rebar 60, with the first end of the tool proximate the center-line of the first rebar 60, as again shown in FIG. 8. The user can then visually see that the space between the second end of the tool and the second rebar 62 is the same length of the card, as depicted by the faint tool. Accordingly, the total distance is two card lengths, or twelve inches. Alternatively, with the first end of the tool 10 proximate the center-line of the first rebar 60, the user can place a temporary mark (not shown) on one of the rebars 63 that are perpendicular to the first 60 and second 62 rebars proximate the second end of the tool 10. The tool can then be shifted to the faint position in FIG. 8 so that the first end of the tool is proximate the mark, and the other end of the tool is proximate the center-line of the second rebar 62 to be measured. Thus the distance between the first 60 and second 62 rebars is two tool major dimensions or twelve inches.

Figure 5:
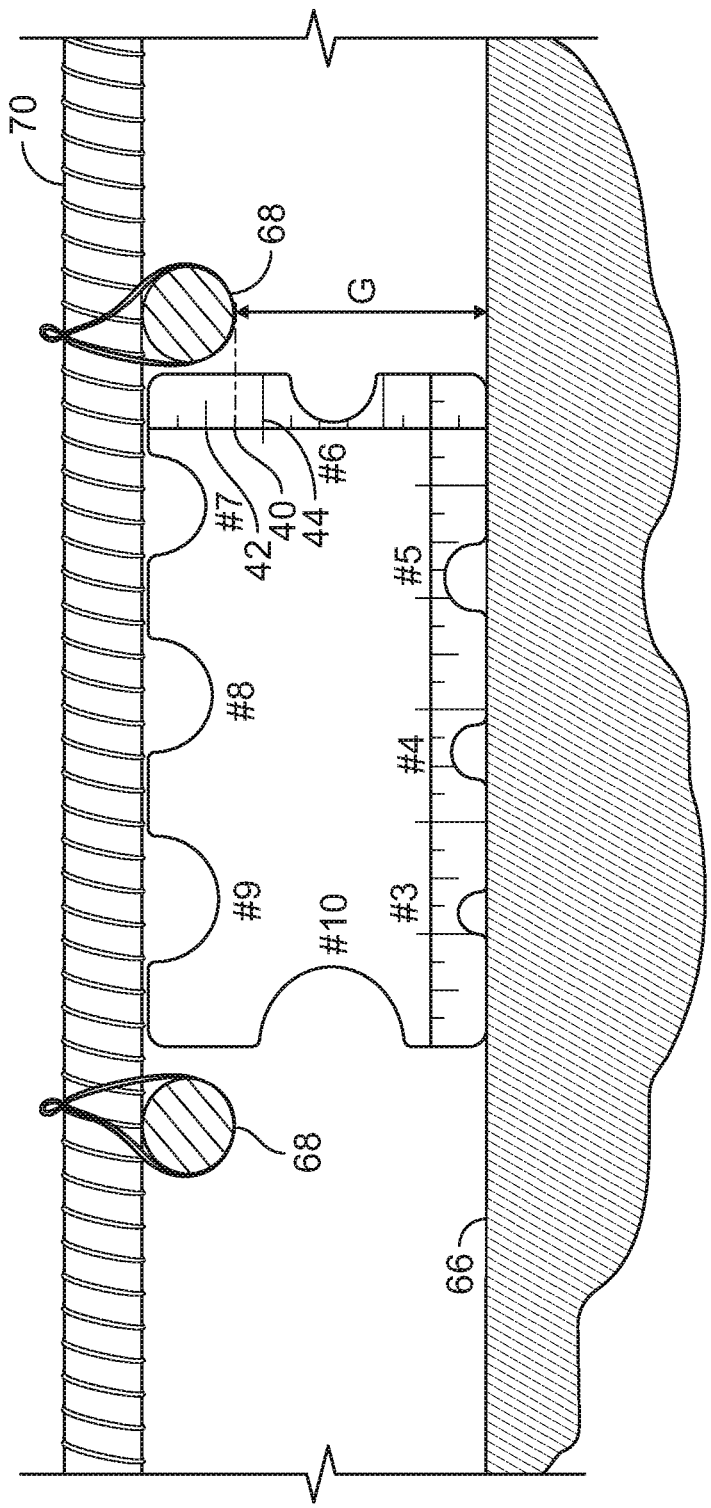
FIG. 5 is an elevation view of one embodiment of the tool being used to measure bottom clear cover between a substrate and rebar.

Clear cover is a term used to define the distance between the outer surface of a resulting concrete structure and the closest rebar inboard of that surface. Bottom clear cover is defined by the location of the rebar with respect to the top of a substrate or bottom formwork, while top and side clear cover is defined by location of the rebar with respect to the top and side walls of the formwork. Standard clear cover is 2 to 4 inches in water containing structures. Accordingly, with the tool being 3 inches wide, one can readily determine and verify the clear cover with a user's single hand. For example, in FIG. 5 bottom clear cover G, in this case 2.25 inches, is being measured between a substrate 66 and the bottom of rebar 68 that are running in and out of the page by noting the hash marks on periphery 18 of the minor dimension of the tool.

Figure 6:
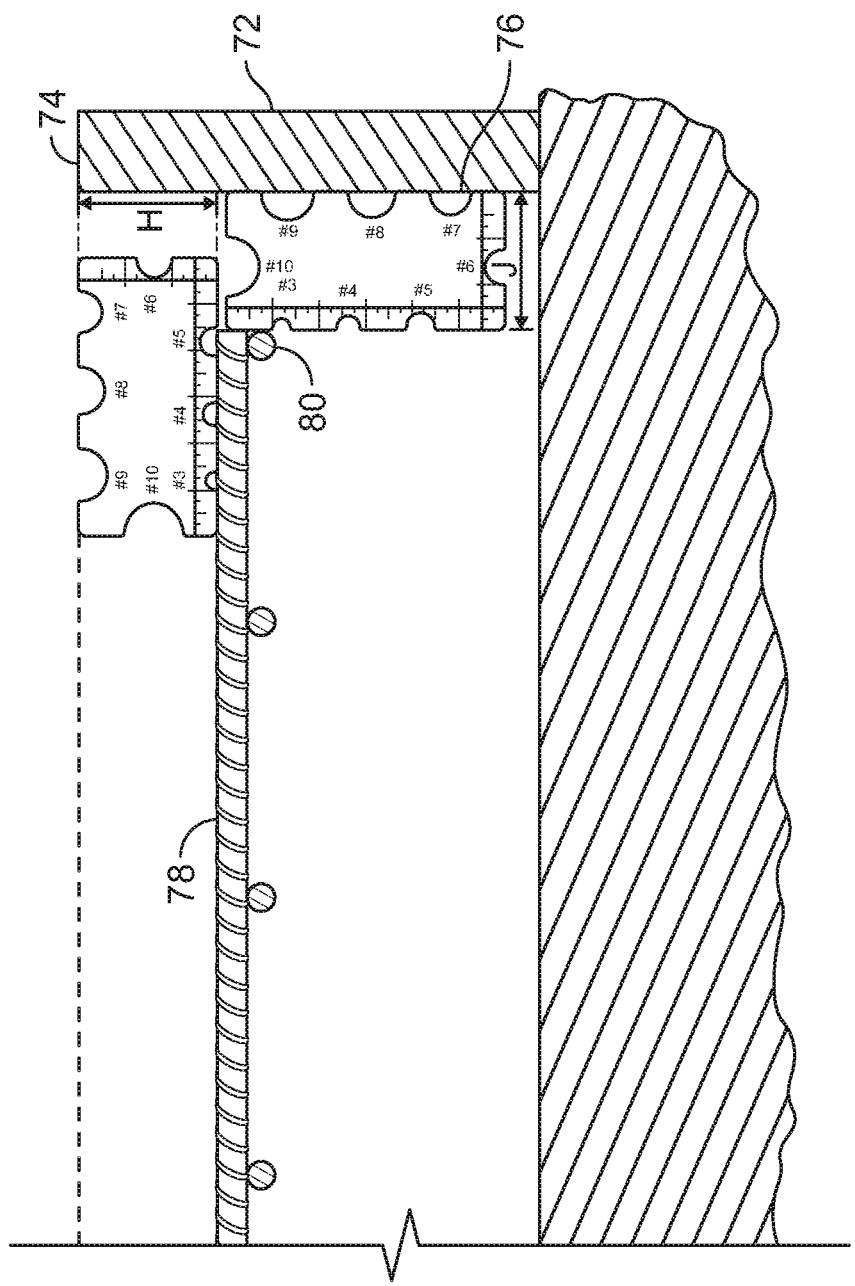
FIG. 6 is an elevation view of tools being used to measure side and top clear cover.

In FIG. 6, top clear cover H, in this case three inches, and side clear cover J, in this case also three inches, is being measured. Top clear cover H is measured by placing the tool 10 on the upper rebar 78 and measuring the distance between the top of the rebar 78 and the top 74 of the formwork 72. It can be appreciated that when the concrete is placed or poured, it will be leveled off to the height of the top 74 of the formwork 72 creating the upper surface of the concrete. The side clear cover J is measured by the tool 10 between the outermost rebar 80 and the inside face or surface 76 of the formwork 72. If more clear cover is called for in the specification, the hash marks along the 6-inch major dimension of the tool can be used to measure the clear cover. If clear cover of more than six inches is called for, the tool can be used to measure longer distances in a manner similar to that described in FIG. 8.

Figure 9:
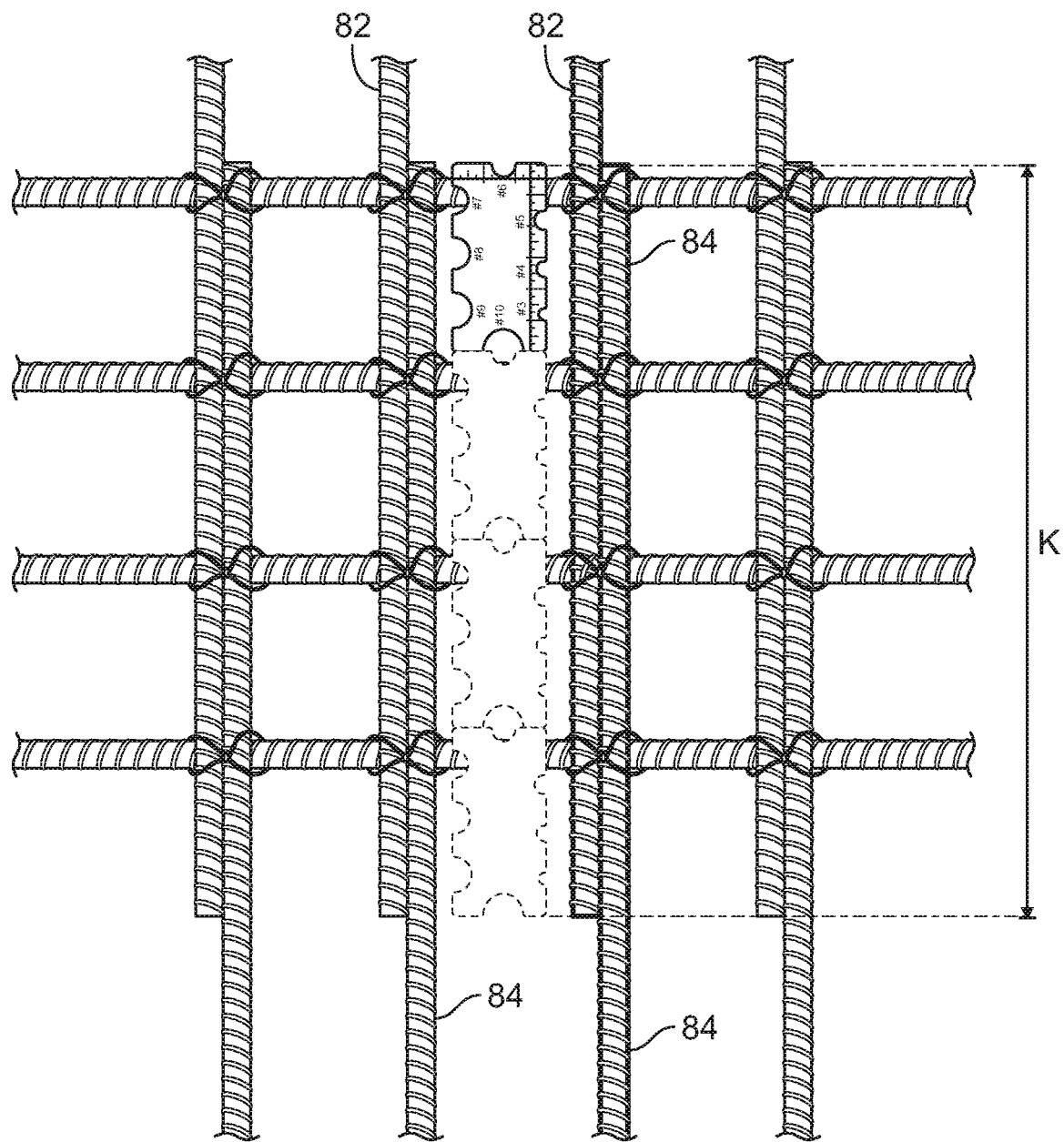
FIG. 9 is a top view of a tool being used to measure the overlapping length of adjacent rebars where the length of the overlap is longer than the length of the tool.

FIG. 9 shows an embodiment of the tool 10 being used to measure the length of overlap of a first 82 and second 84 adjacent, in this case tied together, rebars. It can be appreciated that concrete structures may be longer than the length of a single rebar. In order to accommodate longer structures, rebars are often overlapped, so one can extend in a first direction and the other in a second direction. Overlapping rebar is also used in connecting upstanding concrete walls to horizontal concrete floors by bending the rebar associated with one of the floor or wall at the junction and overlapping it with the rebar in the other of the floor or wall. The length K of the overlap is important factor in the strength of the resulting structure. FIG. 9 shows the tool being used as a scale reference for measurement of the length K of the overlap. Similar to the use of the tool in FIG. 8, the first end of the tool can be placed proximate the end of the second rebar 84 extending in the second direction and a temporary mark can be placed on the first rebar 82 extending in the first direction proximate the second end of the tool. As shown in the faint lines, the tool can be moved multiple times and additional marks made on the rebar. The length of the overlap is then that multiple plus one, multiplied by the length of the tool, or 6". In the case of FIG. 9, the overlap length is four times 6" or 24".

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed tools, systems and methods without departing from the spirit and scope of what is disclosed. Such embodiments should be understood to fall within the scope of the present disclosure as determined based upon the claims and any equivalents thereof.

I claim:

1. A method of confirming the proper size, location, and spacing of rebar in a concrete structure prior to pouring the concrete comprising the steps of:
   a. erecting formwork around the edge of the structure to be constructed and positioning rebar within the formwork;
   b. measuring the diameter of the rebar positioned within the formwork by using a tool comprising a card having spaced hash marks of a standard distance along its periphery and a plurality of cutouts along its periphery, with each cutout sized to accommodate one standard size of rebar, by placing the card normal to the rebar in the appropriate cutout by identifying the rebar size as the smallest cutout that will fit the rebar without additional space between the rebar and sides of the cutout on either side of the rebar;
   c. measuring the top, side and bottom clear cover by placing the tool on top of or adjacent rebar immediately inboard of the formwork and determining the distance between the rebar and the adjacent formwork by counting the number of hash marks between the surface of the rebar and the surface of the formwork; and,
   d. measuring the spacing between parallel rebars by placing the tool on and normal to a first rebar and determining the distance between the center-line of the first rebar and the center-line of an adjacent rebar by counting the number of hash marks between the first rebar and the adjacent rebar, or estimating the distance between the first rebar and the parallel rebar by using the tool to determine the scale of the distance in the event the spacing is longer than the tool.

2. The method of claim 1 also comprising the step of measuring the overlap length of a first rebar having a first end and extending in a first direction, and an adjacent second rebar having a second end and extending in a second direction by placing the tool on the first rebar with a first end of the tool aligned with the first end of the first rebar and estimating the distance of the first end of the first rebar and the second end of the second rebar by using the tool to determine the scale of the distance.

3. The method of claim 2 wherein the card is rectangular and has at least eight cutouts and each of the cutouts is sized to accommodate one of at least eight standard rebar diameters.

4. The method of claim 2 also comprising the steps of:
   a. photographing the tool while the rebar is located in the proper sized cutout to provide documentation that the properly sized rebar was used in the structure;
   b. photographing the tool while it is being used to measure clear cover;
   c. photographing the tool while it is being used to measure the distance between parallel rebars; and,
   d. photographing the tool while it is being used to measure the overlap length between the first end of the first rebar and the second end of the adjacent second rebar.

5. A system of confirming the proper size, location, and spacing of rebar to provide confirmation of appropriate clear cover and spacing of rebars in a concrete structure during construction of the structure and before placing of the concrete, initially defined by exterior formwork and rebar comprising:
   a. a rebar sizing, location, and spacing tool;
      i. the tool comprising a planar rectangular card having a periphery with a plurality of cutouts around the periphery, each cutout sized to be substantially equivalent to the diameter of a standard rebar diameter; and,
      ii. the tool also comprising hash marks near the periphery, the hash marks located at a standard distance from each other; and,
   b. wherein the diameter of the rebar is confirmed by placing the tool perpendicular to the rebar with the rebar located in the cutout that is substantially equivalent to diameter of the rebar; and,
   c. wherein the clear cover is confirmed by placing the tool on top of or adjacent rebar immediately inboard of the formwork and determining the distance between the rebar and the adjacent formwork by counting the number of hash marks between the surface of the rebar and the surface of the formwork; and,
   d. wherein the rebar spacing is confirmed between parallel rebars by placing the card on and normal to a first rebar and determining the distance between the center-line of the first rebar and the center-line of a parallel rebar by counting the number of hash marks between the first rebar and the adjacent rebar or estimating the distance between the first rebar and the adjacent rebar by using the tool to determine the scale of the distance in the event the spacing is longer than the tool.

6. The system of claim 5 wherein the overlap of a first rebar having a first end and extending in a first direction, and an adjacent second rebar having a second end and extending in a second direction is confirmed by placing the tool comprising the card on the first rebar with a first end of the tool aligned with the first end of the first rebar and estimating the distance of the first end of the first rebar and the second end of the second rebar by using the tool to determine the scale of the distance.

7. The system of claim 6 also comprising:
   a. A photograph of the tool while the rebar is located in the proper sized cutout to provide documentation that rebar of the proper diameter was used in the structure;
   b. A photograph of the tool while it is being used to measure clear cover;
   c. A photograph of the tool while it is being used to measure the distance between parallel rebars; and,
   d. A photograph of the tool while it is being used to measure the overlap length between the first end of the first rebar and a second end of the adjacent second parallel rebar.

8. The system of claim 6 wherein the card is rectangular and has eight cutouts and each of the cutouts is sized to accommodate one of eight standard rebar diameters.

\* \* \* \* \*